US008561239B2

(12) United States Patent
Honeycutt et al.

(10) Patent No.: US 8,561,239 B2
(45) Date of Patent: Oct. 22, 2013

(54) ARTICULATING CAGE

(75) Inventors: Robert W. Honeycutt, Pawleys Island, SC (US); Charles F. Harmon, Sumter, SC (US); James P. Daniel, Florence, SC (US)

(73) Assignee: Safe Rack LLC, Andrews, SC (US)

( * ) Notice: Subject to any disclaimer, the term of this patent is extended or adjusted under 35 U.S.C. 154(b) by 0 days.

(21) Appl. No.: 13/212,163

(22) Filed: Aug. 17, 2011

(65) Prior Publication Data
US 2012/0204362 A1 Aug. 16, 2012

Related U.S. Application Data

(60) Provisional application No. 61/374,541, filed on Aug. 17, 2010.

(51) Int. Cl.
*E01D 15/00* (2006.01)

(52) U.S. Cl.
USPC ........ 14/71.3; 14/31; 14/32; 182/84; 182/131

(58) Field of Classification Search
CPC ...................................... E01D 15/06
USPC ............... 14/36–41, 69.5, 71.1–72.5; 182/84, 182/130, 131
See application file for complete search history.

(56) References Cited

U.S. PATENT DOCUMENTS

| 469,314 | A | * | 2/1892 | Clark | 14/42 |
|---|---|---|---|---|---|
| 1,203,695 | A | * | 11/1916 | Brown | 14/36 |
| 1,674,279 | A | * | 6/1928 | Ebeling | 14/69.5 |
| 2,062,635 | A | * | 12/1936 | Breitwieser | 14/42 |
| 3,062,635 | A | * | 11/1962 | Acker et al. | 504/312 |
| 3,601,220 | A | * | 8/1971 | Saucier | 182/84 |
| 4,013,140 | A | * | 3/1977 | Pradon | 182/1 |
| 4,083,072 | A | * | 4/1978 | Ryan | 14/69.5 |
| 4,280,243 | A | * | 7/1981 | Durrant | 14/71.1 |
| 4,403,362 | A | * | 9/1983 | Durrant | 14/71.1 |
| 4,473,916 | A | * | 10/1984 | Connold | 14/42 |
| 4,572,328 | A | * | 2/1986 | Benko | 182/1 |
| 4,679,657 | A | * | 7/1987 | Bennett et al. | 182/113 |
| 5,042,612 | A | * | 8/1991 | Bennett et al. | 182/1 |
| 5,392,878 | A | * | 2/1995 | Bennett et al. | 182/115 |
| 5,671,823 | A | * | 9/1997 | Oakes | 182/36 |
| 6,223,855 | B1 | * | 5/2001 | Lindner | 182/131 |
| 7,140,467 | B2 | * | 11/2006 | Cook | 182/143 |
| 7,849,637 | B2 | * | 12/2010 | Lowe | 52/69 |
| 7,877,831 | B2 | * | 2/2011 | Digmann et al. | 14/71.1 |
| 7,950,095 | B2 | | 5/2011 | Honeycutt et al. | |
| 8,015,647 | B2 | * | 9/2011 | Bennett | 14/37 |
| 8,051,951 | B2 | * | 11/2011 | Bennett et al. | 182/39 |

(Continued)

OTHER PUBLICATIONS

File History of U.S. Appl. No. 12/837,480.

*Primary Examiner* — Raymond W Addie
(74) *Attorney, Agent, or Firm* — Nelson Mullins Riley & Scarborough LLP

(57) ABSTRACT

An articulating cage configured to raise and lower with respect to a fixed structure. The articulating cage comprises support structures affixed to the fixed structure and that include one or more springs. The articulating cage includes lifting arms that are pivotally connected to the support structures at one end and to a cage portion at the other end. A load chain connects to the springs at one end and to the lifting arm at the other near to the location where the lifting arm connects to the cage portion.

20 Claims, 11 Drawing Sheets

(56) References Cited

U.S. PATENT DOCUMENTS

2010/0031455 A1 2/2010 Honeycutt et al.
2010/0031456 A1 2/2010 Honeycutt et al.
2010/0032633 A1 2/2010 Honeycutt
2011/0047724 A1 3/2011 Honeycutt
2012/0017383 A1 1/2012 Honeycutt

* cited by examiner

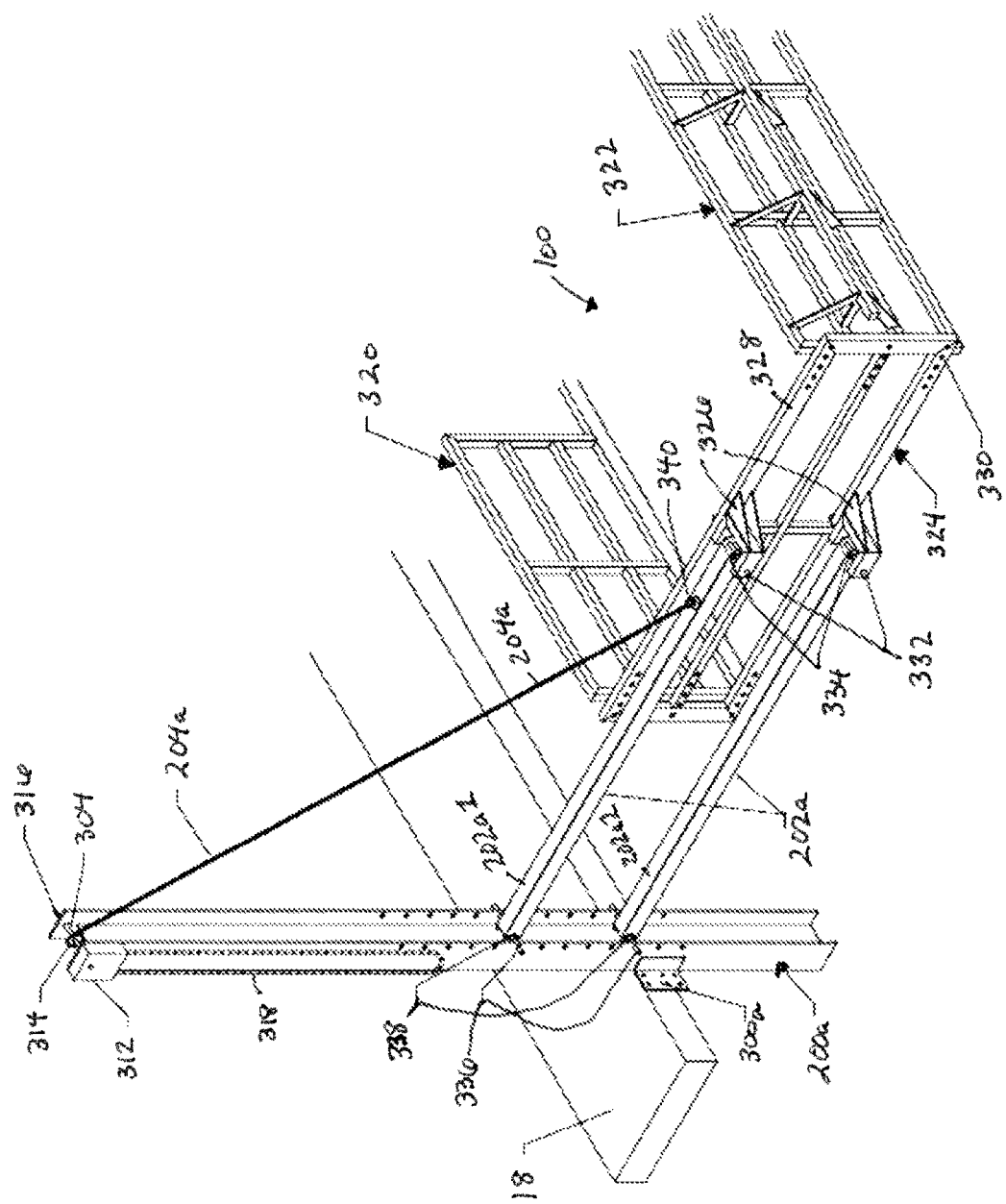

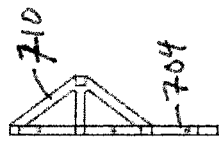
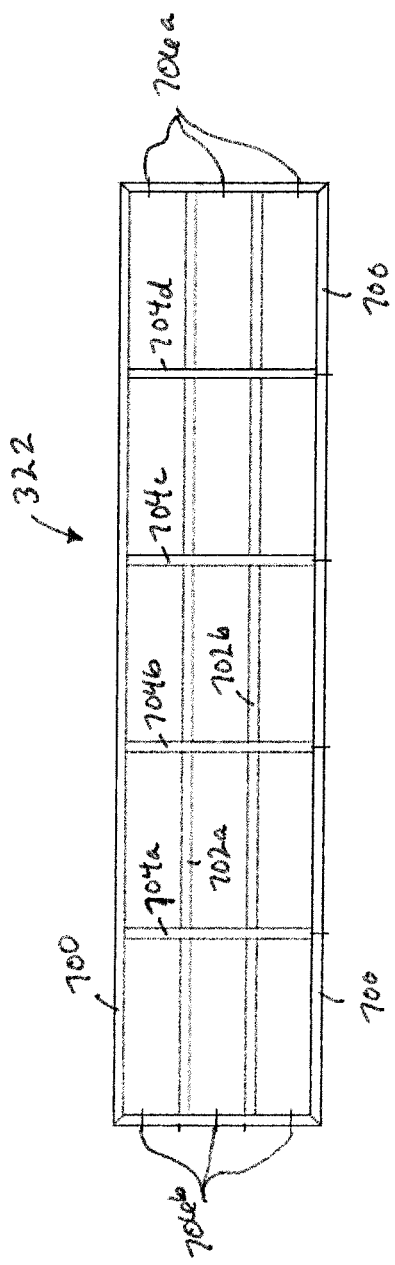

ARTICULATING CAGE

CROSS REFERENCE TO RELATED APPLICATIONS

This application claims the benefit of U.S. patent application Ser. No. 61/374,541 (entitled "Articulating Cage" and filed on Aug. 17, 2010), the entire disclosure of which is hereby incorporated by reference as if set forth verbatim herein and relied upon for all purposes.

FIELD OF THE INVENTION

The present invention relates to fall restraint equipment, and more particularly, to an articulating cage.

BACKGROUND OF THE INVENTION

Fall restraint equipment may include platforms, ramps, bridges, steps, guardrails, gangways, cages, and other support structures. Gangways, for instance, may be used to provide access to an area, such as the top of a storage container. For example, a semi-trailer truck or a railroad carriage transporting dry goods may need to be unloaded from the container's top. A gangway is used to provide workers a path to unload the material. Additionally, an articulating cage may be lowered from the gangway or, alternatively, from a support structure in order to encase the area from which the material is to be unloaded. An example of fall restraint equipment and an articulating cage may be found in U.S. Pat. No. 4,679,657, which is incorporated by reference as if set forth verbatim herein. Cumbersome and/or relatively expensive arrangements of counterbalances and/or chains are currently used to facilitate the movement of such articulating cages.

The major portions of fall restraint equipment are presently constructed by a process involving cutting and welding a large number of smaller components together. The process requires a relatively substantial amount of time, manpower, and components.

SUMMARY OF THE INVENTION

The present invention recognizes and addresses the foregoing considerations, and others, of prior art construction and methods.

In this regard, one aspect of the present invention provides an articulating cage configured to raise and lower with respect to a fixed structure. The articulating cage comprises a pair of support structures configured to be affixed to the fixed structure. At least one of the pair of support structures comprises at least one spring. The articulating cage also includes at least one lifting arm. One end of the lifting arm is pivotally connected to support structure that includes the spring. The other end of the lifting arm is pivotally connected to a cage. A load chain is connected to the spring at one end and to the second end of the lifting arm at the other end.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 3A is a partial, perspective view of the fall restraint equipment of FIG. 2C;

FIG. 7A is a front elevation view of another handrail of the fall restraint equipment of FIG. 3A;

FIG. 7B is a side elevation view of a spacer that may be attached to the handrail of FIG. 7A in accordance with an embodiment of the present invention;

Figure 1:
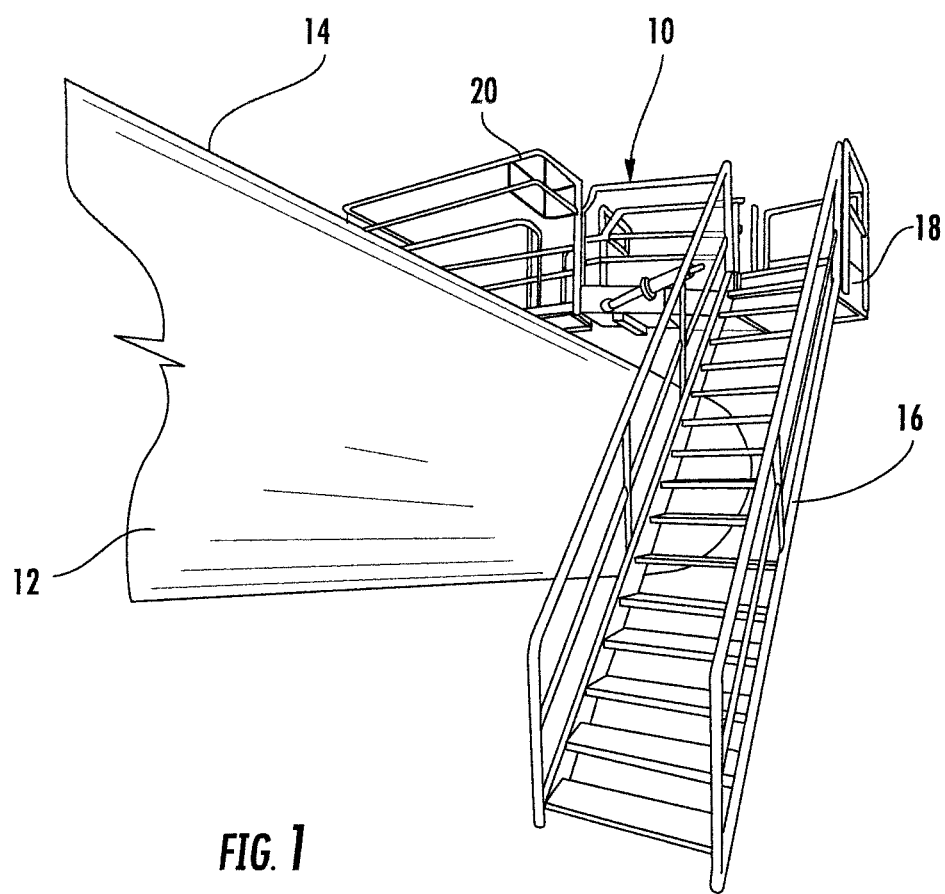
FIG. 1 is a perspective view of fall restraint equipment in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates the placement of a gangway 10 to provide access to a storage container 12 from above. Storage container 12 typically contains material, such as particulate matter, to be unloaded from the container's top indicated at 14. A nearby stairwell 16 provides access to platform 18, to which gangway 10 is attached. A user may access top 14 of container 12 via stairwell 16, platform 18, and gangway 10. An optional cage 20 may be attached to gangway 10.

Examples of gangways, their components, and associated fall restraint equipment are set forth in copending U.S. patent application Ser. No. 12/329,883 (entitled "A Gangway and Method of Manufacturing Same," filed on Dec. 8, 2008, and issued as U.S. Pat. No. 7,950,095 on May 31, 2011), U.S. patent application Ser. No. 12/468,704 (entitled "Fall Restraint Equipment Component and Method for Manufacturing the Same," filed on May 19, 2009, and published as U.S. Published Patent Application No. 2010/0031456 on Feb. 11, 2010), U.S. patent application Ser. No. 12/487,408 (entitled "Fall Restraint Equipment Component and Method for Manufacturing the Same," filed on Jun. 18, 2009, and published as U.S. Published Patent Application No. 2010/0031455 on Feb. 11, 2010), 12/537,842 (entitled "Fall Restraint Equipment Components and Method for Manufacturing the Same," filed on Aug. 7, 2009, and published as U.S. Published Patent Application No. 2010/0032633 on Feb. 11, 2010), U.S. patent application Ser. No. 12/552,811 (entitled "Gangway Handrail and Method for Manufacturing the Same," filed on Sep. 2, 2009, and published as U.S. Published Patent Application No. 2011/0047724 on Mar. 3, 2011), U.S. patent application Ser. No. 12/837,480 (entitled "Mobile Access Unit and Cage" and filed on Jul. 15, 2010), and U.S. patent application Ser. No. 61/366,612 (entitled "Gangway Bearing Retainer Plate" and filed on Jul. 22, 2010), the entire disclosure of each of which is hereby incorporated by reference as if set forth verbatim herein and relied upon for all purposes.

Figure 2C:
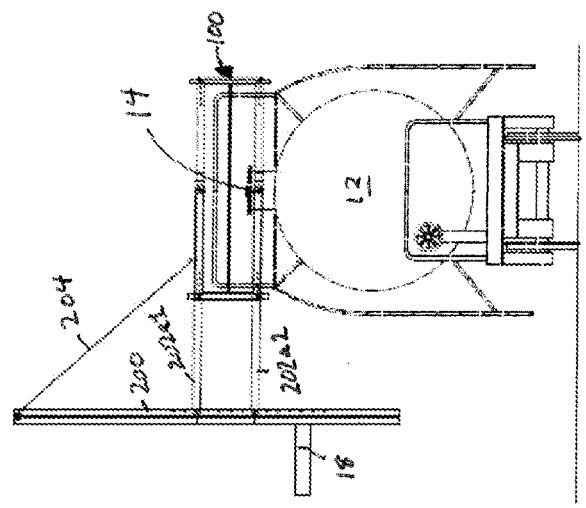
FIG. 2C is a side elevation view of the fall restraint equipment of FIGS. 2A and 2B with the gangway illustrated in FIGS. 2A and 2B removed for simplicity.
Figure 2B:
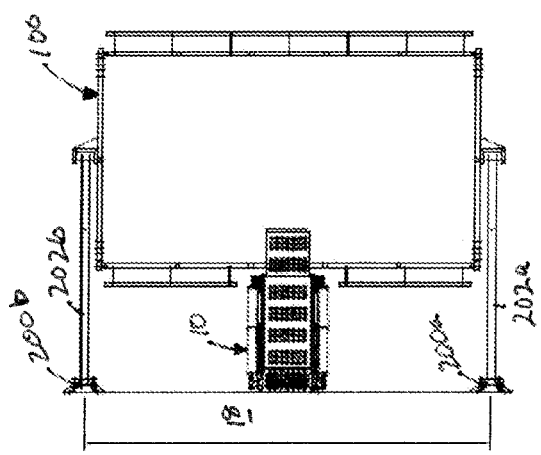
FIG. 2B is a top planar view of the fall restraint equipment of FIG. 2A.
Figure 2A:
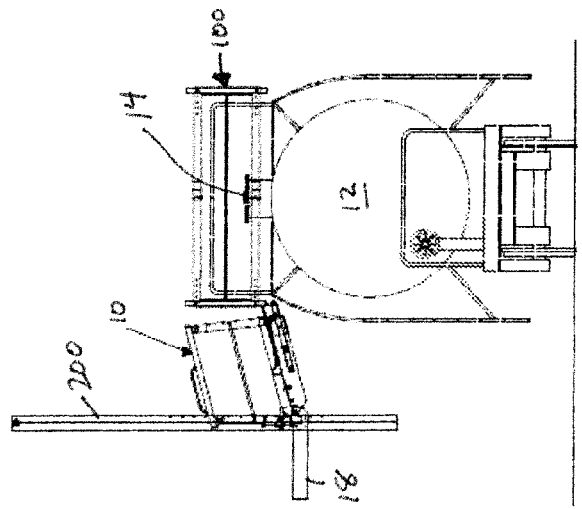
FIG. 2A is a side elevation view of fall restraint equipment in accordance with an embodiment of the present invention.
Figure 2D:
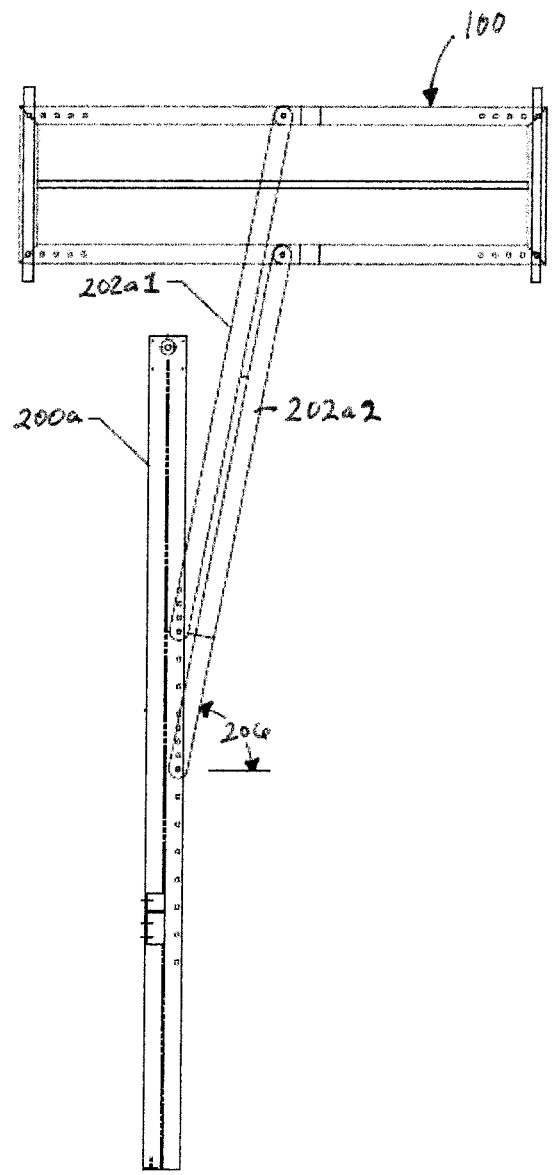
FIG. 2D is a side elevation view of the fall restraint equipment of FIG. 2C, with the container illustrated in FIG. 2C removed for simplicity.

FIGS. 2A, 2B, 2C, and 2D are different views of fall restraint equipment in accordance with various embodiments of the present invention similar to that shown in FIG. 1, but substituting an articulating cage 100 for cage 20 of FIG. 1. In this embodiment, a pair of upright support structures 200 is attached to platform 18. As illustrated in FIG. 2B, each of upright support structures 200 is attached to platform 18 at locations corresponding to respective sides of cage 100. That is, upright support structure 200a corresponds to one side of cage 100, while upright support structure 200b corresponds to the opposite side of the cage.

Cage 100 is connected to the pair of upright support structures 200 via a plurality of lifting arms 202. That is, a pair of lifting arms 202 connects each side of cage 100 to a respective upright support 200. For instance, a pair of lifting arms 202a connects one side of cage 100 to corresponding upright support structure 200a, while a pair of lifting arms 202b connects the opposite side of the cage to corresponding upright support structure 200b.

Each of the pair of lifting arms 202a and 202b is formed from a single, continuous piece of tubular metal that is lasered or otherwise cut to form the lifting arm. In particular, each of the pair of lifting arms 202a and 202b is lasered or otherwise cut to define a pair of apertures on each end of the arm configured to receive a pivot, as described in more detail below. A top surface of each lifting arms 202a and 202b is lasered or otherwise cut to define an aperture configured to receive an eyebolt, nut, and washer combination, also as described below.

It should be understood that lifting arms 202 are pivotally connected to both upright support structures 200 and cage 100 in a manner that allows the cage to pivot with respect to the upright support structures, platform 18, and container 12. That is, the pivoting motion allows the cage to be raised and lowered with respect to top 14 of the container, as denoted by arrows 206. This movement is facilitated by a pair of load chains 204, as described in more detail below. It should be understood that gangway 10 is pivotally attached to platform 18 and/or upright support structures 200 in a manner that allows it to raise and lower similar to the movement of cage 100, as described in more detail in U.S. patent application Ser. Nos. 12/329,883, 12/837,480, and 61/366,612 referenced above.

FIG. 3A is a partial, perspective view of the fall restraint equipment described above with respect to FIGS. 2A, 2B, and 2C. It should be understood that while only one side of the fall restraint equipment is illustrated, the ensuing explanation is applicable to both sides, as the components on the opposite, non-illustrated side are mirror images of, but otherwise similar to, those illustrated. It should be further understood, however, that while only one of upright support structures 200 includes the chain hoist mechanism described below, it may be connected to either support structure.

Referring to FIG. 3A, upright support structure 200 is connected to platform 18 via a pair of supports 300. Supports 300 may be connected to both upright support structure 200 and platform 18 by any suitable fasteners, such as by being bolted on using nuts and washers. Supports 300 may also be welded to either or both of the upright support structure and platform for additional support.

Figure 3C:
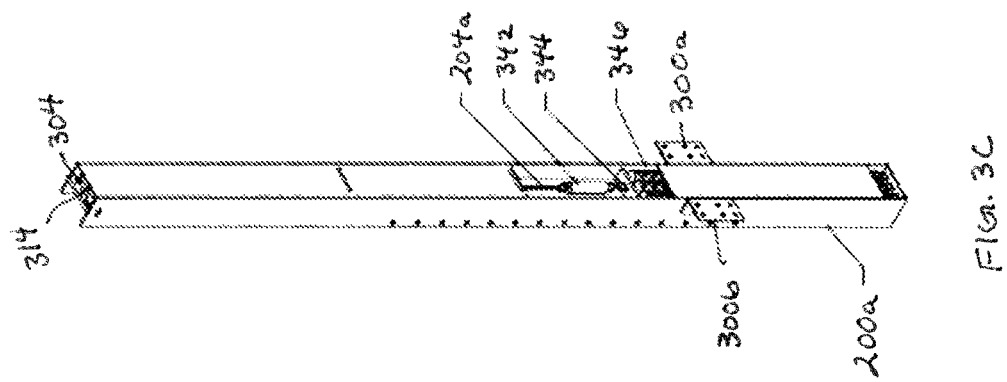
FIG. 3C is a perspective view of the rear of the upright support structure of FIGS. 3A and 3B.
Figure 3B:
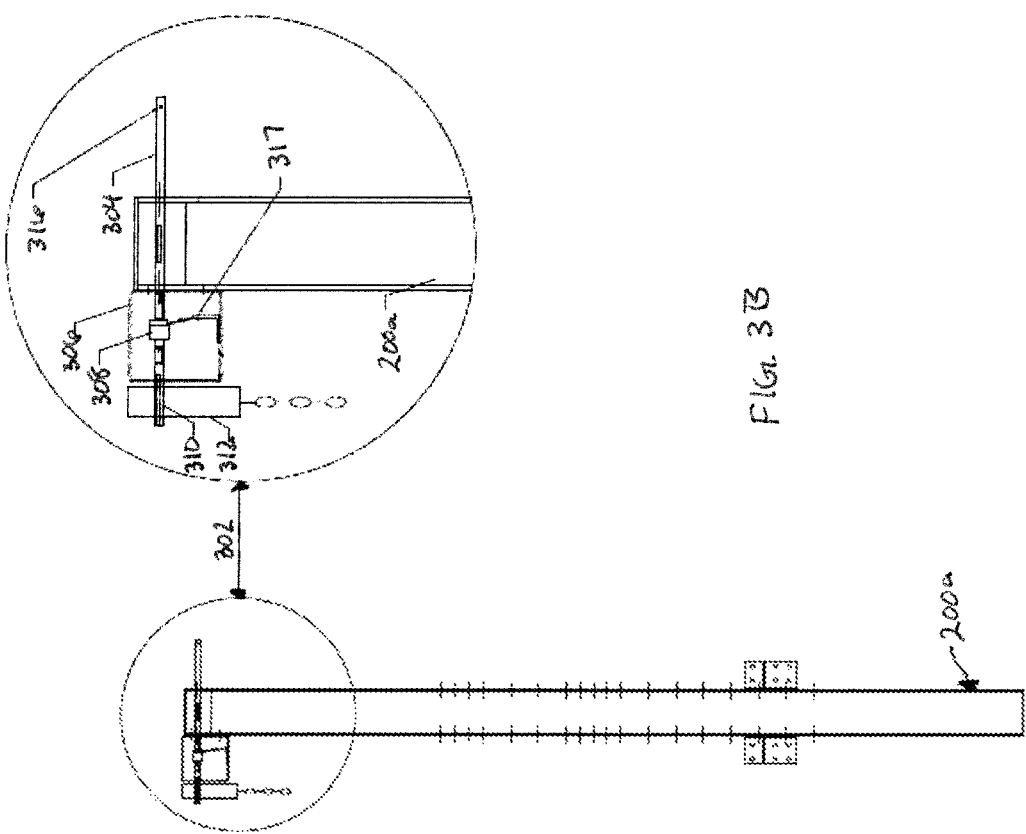
FIG. 3B is a front elevation view of an upright support structure of the fall restraint equipment of FIG. 3A and an exploded view of a top portion of the upright support structure.

Referring additionally to FIG. 3B, a top portion 302 of upright support structure 200a comprises a chain pivot 304, a mount tube 306, a chain stop 308, a hoist pivot 310, a hoist 312, and a load chain sheave/pocket wheel 314 (referred to herein as "wheel 314" for simplicity). Chain pivot 304 is inserted through an aperture defined on one side of upright support structure 200a, wheel 314, another aperture defined on the opposite side of the upright support structure, and a corresponding aperture defined in mount tube 306. Chain pivot 304 is connected to upright support structure 200a via a connection 316. Connection 316 may be any suitable fastener, such as an appropriate flange bearing manufactured by Spyraflo of Peachtree City, Ga. Load chain 204a is connected to wheel 314, which may be any suitable chain sheave/pocket wheel, such as those provided by Replacement Parts Specialists, Inc. of Solon, Ohio.

Mount tube 306 houses chain stop 308 which is connected to the tube via any suitable fastener, such as via a bracket, bolt, nut, and washer combination 317. Chain stop 308 connects to chain pivot 304 on one side and hoist pivot 310 on the other. Hoist pivot 310 is inserted through corresponding apertures defined by each side of hoist 312 and mount tube 306. A pull chain 318 is connected to hoist pivot 310. Pull chain 318 and hoist 312 may be any suitable chain hoist mechanism, such as those provided by Re-Source Industries Inc. of Fort Worth, Tex.

The portion of cage 100 illustrated in FIG. 3A comprises an inboard handrail 320, an outboard handrail 322, and an endframe 324, the constructions and arrangement of which are described in more detail below. A pair of brackets 326 is connected to a top rail 328 and a bottom rail 330, respectively of endframe 324 by any suitable fastener, such as a bolt, nut, and washer combination and/or by welding. A pair of pivots 332 passes through apertures defined by respective brackets 326 and connected to one end of respective lifting arms 202a via any suitable fastener 334, such as a flange bearing. Another pair of pivots 336 passes through respective apertures defined by upright support structure 200a and connected to the opposite ends of lifting arms 202a via any suitable fastener 338, such as a flange bearing. Load chain 204a is connected to lifting arm 202a1 via an eyebolt, washer, and nut combination 340.

Referring additionally to FIG. 3C, upright support structure 200a comprises a turnbuckle 342, a top spring connection 344, a set of springs 346, and a bottom spring connection 348. Lift chain 204a loops around wheel 314, extends down the interior of upright support structure 200a, and terminates in a shackle. One side of turnbuckle 342 is connected to lift chain 204a at the shackle, while the other is connected to top spring connection 344. An example of an appropriate turnbuckle 342 is the turnbuckle provided under the part number 3001T54 by McMaster-Carr Supply Company of Santa Fe Springs, Calif. Set of springs 346 is connected to top spring connection 344 on one side and bottom spring connection 348 on the other, which connects springs 346 to the base of upright support structure 200a.

In the presently-described embodiment, set of springs 346 comprises two torsion springs in a parallel column arrangement, but it should be understood that other types, numbers, and arrangements of springs may be used without departing from the scope of the present invention. It should also be understood that springs 346 are selected in order to counterbalance the weight of cage 100. That is, the force exerted by springs 346 on load chain 204a via top spring connection 344 and turnbuckle 342 is equal to or relatively similar to the force exerted by the cage's weight on the load chain. Accordingly, it is preferable that the force applied by springs 346 to load chain 204a maintains cage 100 in a desired position.

In operation, rotating pull chain 318 in one direction causes hoist pivot 310 to rotate in the same direction. Rotation of hoist pivot 310 in this direction causes chain stop 308 to rotate in the same direction, thereby causing chain pivot 304 to rotate in the same direction. Rotation of chain pivot 304 in this direction causes wheel 314 to rotate in the same direction. As a result, lift chain 204a is retracted toward upright support structure 200a due to the force applied by springs 346 on the lift chain in combination with the force applied by a user on pull chain 318. This movement exerts a pulling force on lifting arm 202a1 thereby causing cage 100 to rise. Lifting arms 202a pivot with respect to upright support structure 200a and to cage 100 due to pivots 336 and 332, respectively, in a manner similar to that described above. As should be understood in the art, chain stop 308 acts to maintain cage 100 in a desired position. Alternatively or in addition to chain stop 308, springs 346 act to maintain the cage in a desired position, as described above.

Cage 100 may be lowered by rotating pull chain 318 in the opposite direction. This causes hoist pivot 310, chain stop 308, chain pivot 304, and wheel 314 to rotate in the opposite direction, thereby extending lift chain 204a and lowering the cage. As set forth above, lifting arms 202a are configured to rotate with respect to upright support structure 200a and cage 100 by operation of pivots 336 and 332, respectively. Alternatively, cage 100 may be lowered by applying a downward force to lifting arms 202a or the cage itself. This may also be facilitated by the force of gravity on (or weight of) cage 100. In one embodiment, chain stop 308 must be disengaged in order to move cage 100, as should be understood in the art.

Figure 4B:
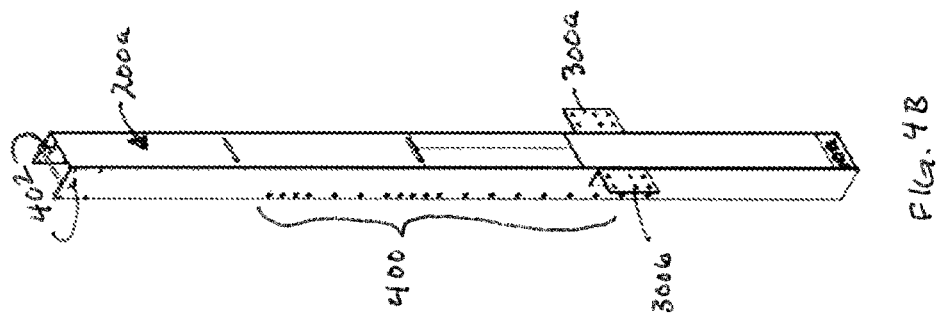
FIGS. 4A and 4B are perspective views of the upright support structure of FIGS. 3A, 3B, and 3C.
Figure 4A:
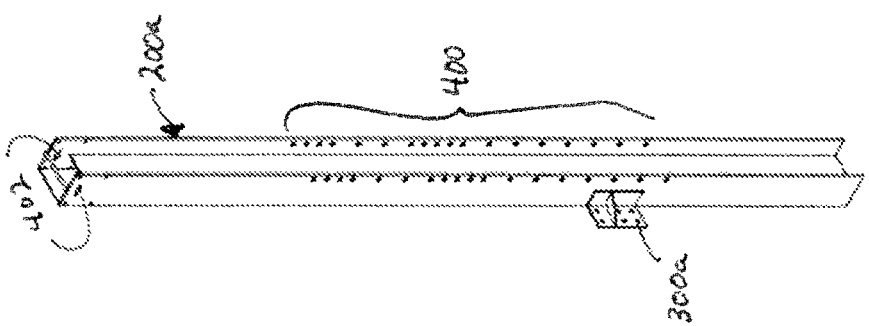

FIGS. 4A and 4B are front and rear perspective views, respectively, of upright support structure 200a. Upright support structure 200a is manufactured from an I-beam or an H-beam that is lasered or otherwise cut to take the form of the structure as illustrated. For instance, the I-beam or H-beam is lasered or otherwise cut to define a plurality of apertures 400 configured to receive pivots 336 (FIG. 3A) as described above. It should be understood that each of apertures 400 is configured to receive pivots 336 so that lifting arms 202a may be moved or relocated vertically along upright support structure 200a. As a result, cage 100 may be moved or relocated vertically with respect to upright support structure 200a.

The I-beam or H-beam is also lasered or otherwise cut to define apertures 402 configured to receive chain pivot 304, also as described above. Brackets 300 are connected to upright support structure 200a in the manner described above. Additionally, bottom spring connection 348 is connected to the base of upright support structure 200a in any suitable manner, such as by bolts, nuts, and washers and/or by welding.

Figure 5A:
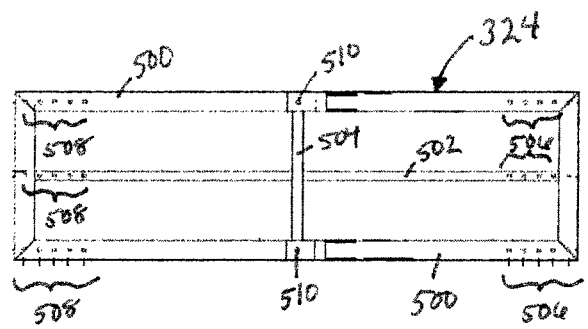
FIGS. 5A and 5B are front elevation and top planar views, respectively, of an endframe of the fall restraint equipment of FIG. 3A.
Figure 5B:
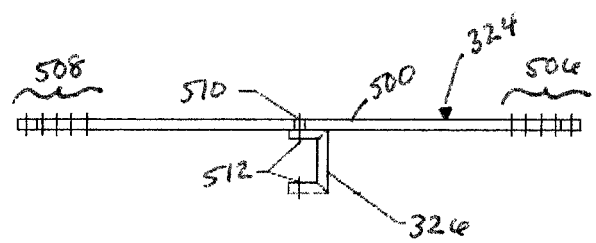

FIGS. 5A and 5B are a front elevation view and a top planar view, respectively, of endframe 324 of cage 100 (FIG. 3A). Endframe 324 comprises an outer rail 500, a midrail 502, and a support rail 504. Each of rails 500, 502, and 504 are formed from a single, continuous piece of tubular metal that is lasered or otherwise cut to form the resulting rail. For instance, the corners of outer rail 500 are lasered or otherwise cut to define apertures that allow the outer rail to be folded at 90 degree angles in order to form a rectangle. In this regard, endframe 324 is formed in a manner similar to the manner by which the handrails described in U.S. patent application Ser. No. 12/537,842 referenced above and illustrated in FIGS. 3 through 18 therein are formed.

One side of outer rail 500 and midrail 502 are lasered or otherwise cut to define apertures 506, while the opposite side of the outer rail and midrail are lasered or otherwise cut to define apertures 508. Apertures 506 and 508 are configured to allow endframe 324 to connect to inboard handrail 320 and outboard handrail 322, respectively. That is, a set of apertures 506 coalign with a set of apertures defined on the outer surface of inboard handrail 320. Suitable fasteners such as bolts, washers, and nuts are used to connect endframe 324 to inboard handrail 320 via these apertures. Likewise, a set of apertures 508 coalign with a set of apertures defined on the outer surface of outboard handrail 322. Suitable fasteners connect endframe 324 to outboard handrail 322 via these apertures. It should be understood that the plurality of each apertures 506 and 508 allow handrails 320 and 322 to be moved or relocated in a horizontal manner with respect to endframe 324. It should be further understood that this allows the depth or interior area defined by cage 100 to be altered as desired.

Outer rail 500 is also lasered or otherwise cut to define a pair of apertures 510, which coalign with a pair of apertures 512 defined by each of brackets 326. Apertures 510 and 512 are configured to receive pivots 332 (FIG. 3A) in the manner described above, thereby allowing cage 100 to rotate with respect to lifting arms 202.

Figure 6:
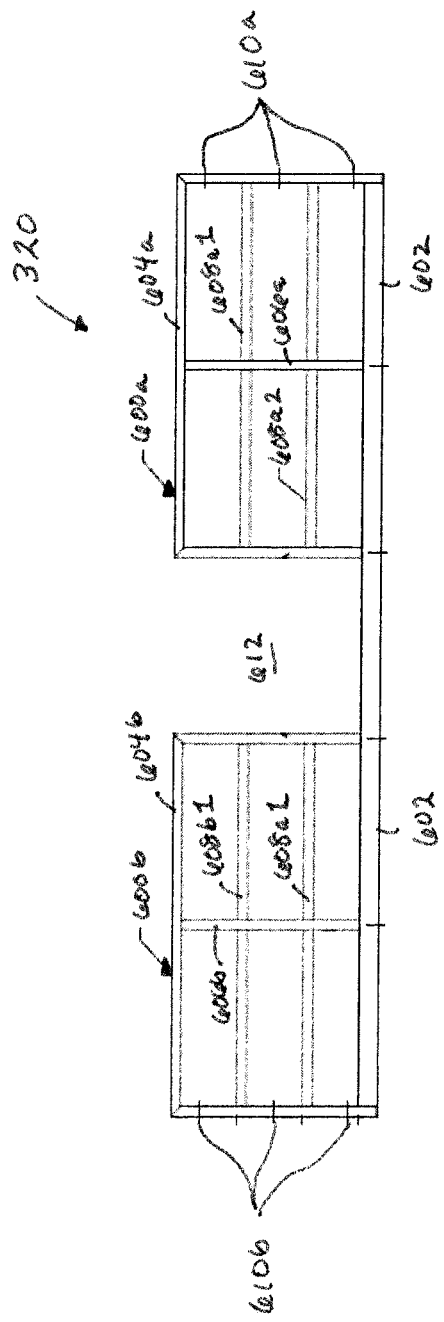
FIG. 6 is a front elevation view of one handrail of the fall restraint equipment of FIG. 3A.

FIG. 6 is a front elevation view of inboard handrail 320 of cage 100 (FIG. 3A). Inboard handrail 320 comprises two sets of handrails 600 connected to a base rail 602. Each of handrails 600 comprises an outer rail 604, a midrail 606, and a pair of cross rails 608. Handrails 600 are formed and attached to base rail 602 in a manner similar to that described in U.S. patent application Ser. No. 12/537,842 referenced above and illustrated in FIGS. 3 through 18 therein. An outer surface of each of outer rails 600 is lasered or otherwise cut to define apertures 610 that correspond with apertures 508 in order to allow inboard handrail 320 to be connected to endframes 324 in the manner described above. It should be understood that the arrangement of handrails 600 defines a gap (denoted at 612) between the two handrails, which allows a user to enter the interior of cage 100.

FIG. 7A is a front elevation view of outboard handrail 322 comprising an outer rail 700, a pair of cross rails 702, and a plurality of vertical rails 704. Each of rails 700, 702, and 704 is formed from a single, continuous piece of tubular metal that is lasered or otherwise cut to form the resulting rail. Outboard handrail 322 is formed in a manner similar to that described in U.S. patent application Ser. No. 12/537,842 referenced above and illustrated in FIGS. 3 through 18 therein. Outer surfaces of outer rail 700 are lasered or otherwise cut to define a plurality of apertures 706 that correspond to apertures 506 of endframe 324 (FIG. 5A) that allow outboard handrail 322 to connect to the endframe. FIG. 7B is a side elevation view of a spacer 710 that may be attached to each vertical rail 704.

Figure 8A:
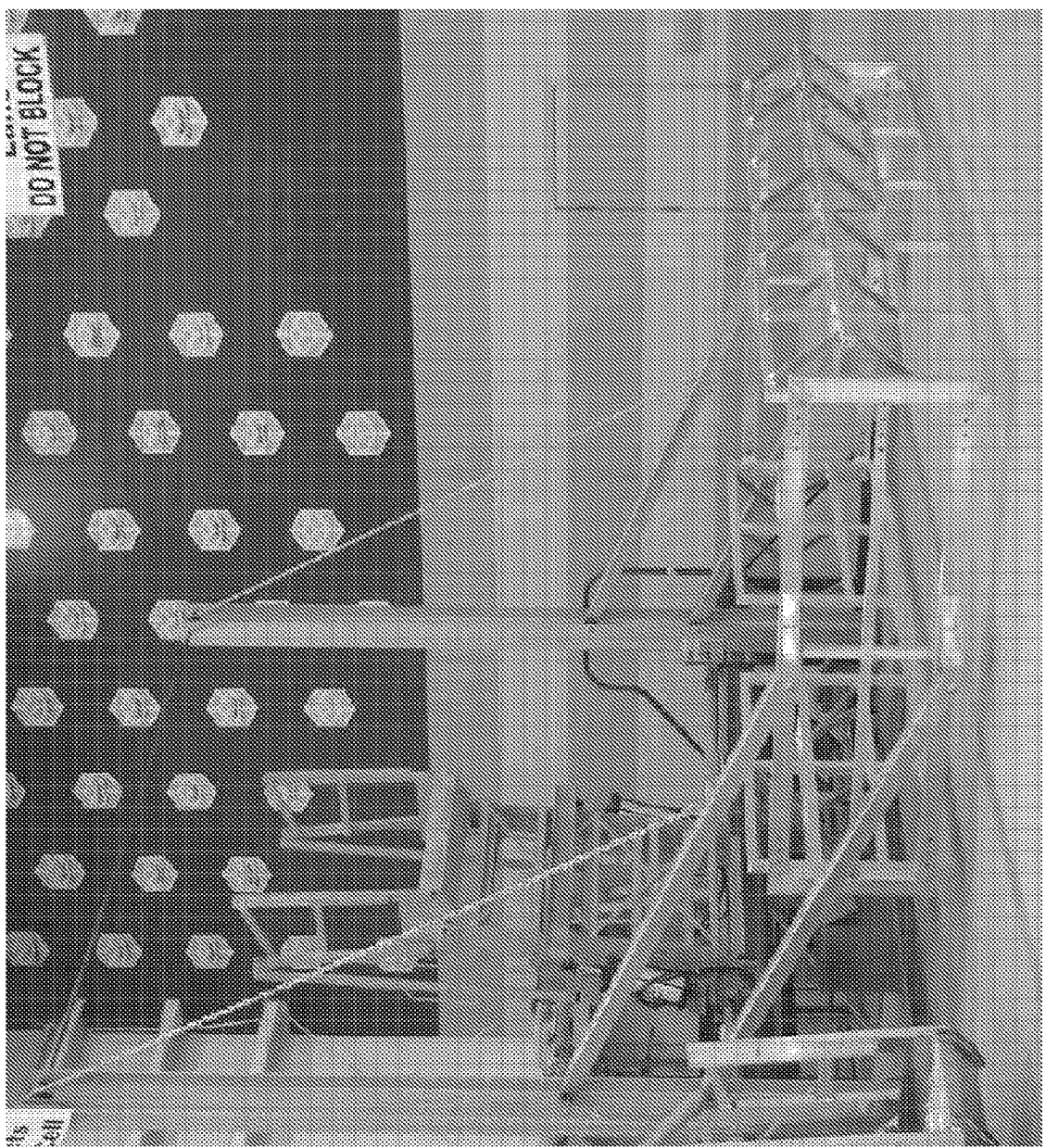
FIG. 8A is a photograph of fall restraint equipment in accordance with an embodiment of the present invention.
Figure 8B:
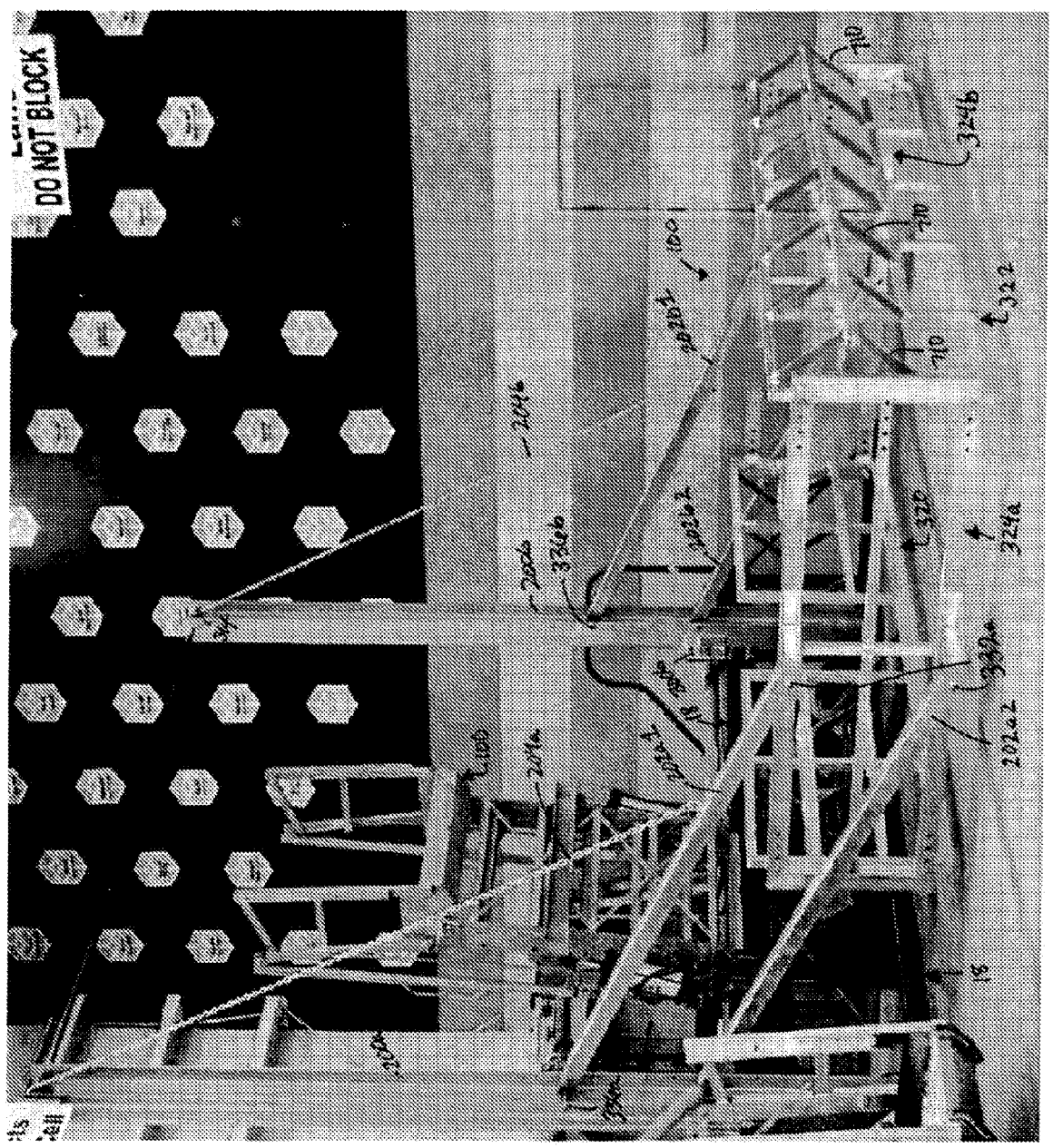
FIG. 8B is a marked-up copy of the photograph of FIG. 8A.

FIG. 8A is a photograph of fall restraint equipment similar to that illustrated in FIGS. 2A through 7B above. FIG. 8B is a marked-up version of the photograph of FIG. 8A that has been labeled with reference numerals corresponding to those set forth in FIGS. 2A through 7B by way of an example.

It should be understood that the above description discloses an articulating cage that may be raised and lowered with respect to a surface of a container. It should be further understood that the cage portion is attached to lifting arms and uprights in a manner that facilitate such movement. Specifically, the uprights include springs that exert a force on the lifting arms via chains that facilitate the maintenance of the cage portion in a desired position. It should be understood, however, that the size (and, thus, the weight) of the articulating cage and its components may be changed to accommodate various scenarios without departing from the scope of the present invention.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. An apparatus configured to raise and lower an articulating cage with respect to a fixed structure, the apparatus comprising:
    a pair of support structures configured to be affixed to the fixed structure, wherein at least one of the pair of support structures comprises a spring;
    first and second lifting arm arrangements, each of said lifting arm arrangements comprising upper and lower lifting arms having:
        a first end pivotally connected to a respective one of the pair of support structures such that said upper and lower lifting arms of said first lifting arm arrangement are pivotally connected to a first support structure of said pair of support structures and said upper and lower lifting arms of said second lifting arm arrangement are pivotally connected to a second support structure of said pair of support structures; and
        a second end pivotally connected to the articulating cage so as to allow the second end of the upper and lower lifting arms to pivot relative to a floor of the articulating cage;
    a load device connected to the spring at one end and proximate to the second end of the first lifting arm arrangement at the other end; and
    a hoist operatively connected to the load device to cause movement of the load device in order to raise and lower said articulating cage.

2. The apparatus of claim 1, wherein the second ends of the lower lifting arms of the first and second lifting arrangements are indirectly connected to the floor of the articulating cage so that the second ends are directly connected to a support member that is connected to the floor.

3. The apparatus of claim 1, wherein operation of the hoist causes the articulating cage to be selectively disposed in first position and a second position each of which is in a plane that is perpendicular to the pair of support structures, wherein the first and second positions are displaced from each other.

4. The apparatus of claim 3, wherein the first position is such that the first and second lifting arm arrangements are disposed perpendicular to the pair of support structures, and wherein the second position is such that the first and second lifting arm arrangements are disposed at an angle less than 90 degrees relative to the pair of support structures.

5. The apparatus of claim 1, wherein the articulating cage comprises railings connected to be fixed with respect to the floor.

6. The apparatus of claim 5, wherein said second end of said upper and lower lifting arms is pivotally connected to the railings.

7. The apparatus of claim 1, wherein the first end of said upper and lower lifting arms is adjustably connected to the pair of support structures such that the position of the first end of the upper and lower lifting arms is adjustable on the pair of support structures.

8. The apparatus of claim 1, wherein the load device comprises a load chain.

9. The apparatus of claim 1, wherein the floor of the articulating cage is configured to support a person standing thereon.

10. A method to raise and lower an articulating cage with respect to a fixed structure, the method comprising:
    providing an apparatus comprising:
        a support structure configured to be affixed to the fixed structure;
        a lifting arm arrangement comprising upper and lower lifting arms having:
            a first end pivotally connected to the support structure; and
            a second end pivotally connected to the articulating cage so as to allow the second end of the upper and lower lifting arms to pivot relative to a floor of the articulating cage, wherein the floor of the articulating cage is configured to support an object resting thereon;
        a load device connected proximate to the second end of the lifting arm arrangement such that movement of the load device causes movement of the articulating cage; and
    pulling the load device so that the upper and lower lifting arms are pivoted relative to the support structure at said first end thereof and are pivoted relative to the floor of the articulating cage at said second end thereof such that the floor remains horizontal as the articulating cage is raised and lowered.

11. A system for moving an articulating cage relative to a fixed structure, the system comprising:
    an upright support configured to be affixed to the fixed structure;
    a lifting arm arrangement having a first end and a second end, said first end pivotally connected to the upright support at upper and lower connection locations; and
    said second end of said lifting arm arrangement pivotally connected to the articulating cage at upper and lower connection locations so as to allow the second end of said lifting arm arrangement to pivot relative to a floor of the articulating cage, wherein the floor of the articulating cage is configured to support an object resting thereon, thereby allowing the articulating cage to be lifted or lowered along an arc but allowing the floor of the articulating cage to remain horizontal;
    a load device connected proximate to the second end of the first lifting arm arrangement, the load device configured to support the articulating cage such that movement of the load device causes movement of the articulating cage; and a hoist operatively connected to the load device to cause movement of the load device in order to raise and lower said articulating cage.

12. The system of claim 11, wherein said lifting arm arrangement comprises upper and lower lifting arms arranged parallel to one another.

13. The system of claim 11, further comprising:
   a second upright support configured to be affixed to said fixed structure; and
   a second lifting arm arrangement pivotally connected at a first end to said second upright support and at a second end to the articulating cage.

14. The system of claim 11, wherein the first end of the lifting arm arrangement is adjustably connected to the upright support such that the position of the first end of the lifting arm arrangement is adjustable on the upright support.

15. The system of claim 11, wherein the load device comprises a load chain.

16. The system of claim 15, wherein the hoist comprises a wheel rotatably mounted proximate a top end of said upright support.

17. The system of claim 16, wherein the hoist comprises a pull chain operatively connected to said wheel.

18. The system of claim 16, wherein an opposite end of the load chain is connected to at least one spring.

19. The system of claim 18, wherein the at least one spring is fixedly connected to the upright support.

20. The system of claim 19, wherein the at least one spring is at least partially enclosed by the upright support.

\* \* \* \* \*